(12) United States Patent
Lee

(10) Patent No.: US 9,594,897 B2
(45) Date of Patent: Mar. 14, 2017

(54) CRUM CHIP MOUNTABLE IN COMSUMABLE UNIT, IMAGE FORMING APPARATUS FOR AUTHENTIFICATING THE CRUM CHIP, AND METHOD THEREOF

(71) Applicant: Samsung Electronics Co., Ltd., Suwon-si (KR)

(72) Inventor: Sang-hyong Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/242,236

(22) Filed: Apr. 1, 2014

(65) Prior Publication Data
US 2015/0089630 A1 Mar. 26, 2015

(30) Foreign Application Priority Data
Sep. 25, 2013 (KR) .................. 10-2013-0113733

(51) Int. Cl.
*G06F 21/44* (2013.01)
*G03G 21/18* (2006.01)

(52) U.S. Cl.
CPC ......... *G06F 21/44* (2013.01); *G03G 21/1892* (2013.01)

(58) Field of Classification Search
None
See application file for complete search history.

(56) References Cited

U.S. PATENT DOCUMENTS 6,438,329 B1 8/2002 Budnik et al.
7,231,042 B2 6/2007 Kori et al.
7,836,478 B2 11/2010 Jung
7,934,049 B2 4/2011 Holtzman et al.
2004/0153415 A1* 8/2004 Adkins et al. .................. 705/59
2004/0223011 A1* 11/2004 Adkins et al. .................. 347/7
2006/0149969 A1 7/2006 Song
(Continued)

FOREIGN PATENT DOCUMENTS

JP 2001-245270 9/2001
JP 2006-85807 3/2006
(Continued)

OTHER PUBLICATIONS

International Search Report and Written Opinion of the International Searching Authority dated Nov. 18, 2014 in International Patent Application PCT/KR2014/006637.
(Continued)

*Primary Examiner* — Kaveh Abrishamkar
(74) *Attorney, Agent, or Firm* — Staas & Halsey LLP

(57) ABSTRACT

Provided herein is an image forming apparatus, comprising: a consumable unit where a CRUM (Customer Replaceable Unit Monitoring) chip is mounted; and a main body configured to perform at least one of a first authentication and a second authentication of the consumable unit, when the consumable unit is mounted, wherein the main body comprises: a main controller for performing the first authentication according to firmware stored in the image forming apparatus; and an authentication controller for using at least one ASIC (Application Specific Integrated Circuit) to perform the second authentication of the consumable unit. Accordingly, it is possible to effectively authenticate a consumable unit even when the image forming apparatus is hacked.

20 Claims, 15 Drawing Sheets

(56) References Cited

U.S. PATENT DOCUMENTS

| | | |
|---|---|---|
| 2006/0153579 A1 | 7/2006 | Phipps et al. |
| 2007/0230694 A1 | 10/2007 | Rose et al. |
| 2009/0220077 A1 | 9/2009 | Lee et al. |
| 2010/0020350 A1 | 1/2010 | Lee et al. |
| 2011/0004768 A1* | 1/2011 | Cho et al. ............... 713/182 |
| 2011/0093702 A1 | 4/2011 | Eom et al. |
| 2012/0134686 A1* | 5/2012 | Jones et al. ............... 399/12 |
| 2013/0070279 A1 | 3/2013 | Misumi |

FOREIGN PATENT DOCUMENTS

| | | |
|---|---|---|
| JP | 2007-166439 | 6/2007 |
| JP | 2011-59880 | 3/2011 |
| KR | 10-2006-0070684 | 6/2006 |
| KR | 10-2006-0078688 | 7/2006 |
| KR | 10-2007-0017854 | 2/2007 |

OTHER PUBLICATIONS

Extended European Search Report issued Mar. 2, 2015 in corresponding European Patent Application No. 14185812.6.

\* cited by examiner

FIG. 4

| General Information | |
|---|---|
| OS Version | CLP300_V1.30.12.35 02-22-2007 |
| SPL-C Version | 5.24 06-28-2006 |
| Engine Version | 6.01.00(55) |
| USB Serial Number | BH45BAIP914466B. |
| Set Model | DOM |
| Service Start Date | 2007-09-29 |
| Option | |
| RAM Size | 32 Mbytes |
| EEPROM Size | 4096 bytes |
| USB Connected (High) | |
| Consumables Life | |
| Total Page Count | 774/93 Pages(Color/mono) |
| Fuser Life | 1636 Pages |
| Transfer Roller Life | 864 Pages |
| Tray1 Roller Life | 867 Pages |
| Total Image Count | 3251 Images |
| Imaging Unit/Deve Roller Life | 61 Images/19 Pages |
| Transfer Belt Life | 3251 Images |
| Toner Image Count | 14/9/14/19 Images(C/M/Y/K) |
| Toner Information | |
| Toner Remains Percent | 99%/91%/92%/100% (C/M/Y/K) |
| Toner Average Coverage | 5%/53%/31%/3% (C/M/Y/K) |
| Consumables Information | |
| Cyan Toner | SAMSUNG(DOM) |
| Magenta Toner | SAMSUNG(DOM) |
| Yellow Toner | SAMSUNG(DOM) |
| Black Toner | SAMSUNG(DOM) |
| Imaging unit | SAMSUNG(DOM) |
| Color Menu | |
| Custom Color | Manual Adjust(CMYK : 0,0,0,0) |
| Setup Menu | |
| Power Save | 20 Minutes |
| Auto Continue | On |
| Altitude Adj. | Plain |

CRUM CHIP MOUNTABLE IN COMSUMABLE UNIT, IMAGE FORMING APPARATUS FOR AUTHENTIFICATING THE CRUM CHIP, AND METHOD THEREOF

CROSS-REFERENCE TO RELATED APPLICATIONS

This application claims the priority benefit from Korean Patent Application No. 10-2013-0113733, filed in the Korean Intellectual Property Office on Sep. 25, 2013, the disclosure of which is incorporated herein by reference.

BACKGROUND

1. Field

Embodiments relate to a Customer Replaceable Unit Monitoring (CRUM) chip, an image forming apparatus for authenticating the CRUM chip, and an authenticating method thereof, and more particularly to an image forming apparatus configured to perform a plurality of authentications that are made individually, a CRUM chip authenticated thereby, and an authentication method thereof.

2. Description of the Related Art

As computers are being increasingly widespread, penetration rates of computer peripherals are also increasing. Most representative examples of computer peripherals are printers, facsimiles, scanners, copy machines, and multiplexers etc.

Image forming apparatuses refer to apparatuses configured to print images on paper using medium such as ink or toner, or to store images in a computer readable record medium. Ink and toner are consumables that are used every time an image forming operation is made and exhausted when used for or more than a predetermined period of time.

When ink or toner is exhausted, a user must replace the unit where the ink or toner is stored. Components or configurative elements that may be replaced in the process of using an image forming apparatus are called consumable units or replaceable units. For brevity of explanation, these components or configurative elements will be referred to as consumable units.

Besides the consumable units such as ink or toner that is eventually exhausted and thus needs to be replaced, there are types of units of which their characteristics change and thus need to be replaced due to poor printing quality. That is, besides developers for different colors, components such as intermediate transfer belts can also be consumable units.

More specifically, an image forming apparatus includes an electrification unit, transcription unit, and settling unit, in which various types of rollers and belts used in each unit may be worn out or deteriorated, thereby significantly degrading the quality of images. Thus, users have to replace each configurative unit, that is, replace a consumable unit at every appropriate replacing period so that clean images may be generated in printing operations.

For good management of such consumable units, recently, memories are being attached to consumable units to transceive information to and from main bodies. For example, various usage information such as number of print pages, number of output dots, and use period of an image forming apparatus may be recorded in the memory of a consumable unit. Accordingly, a user or manager may record various information related to the consumable unit directly in the consumable unit, so as to precisely manage unit replacement period etc. even if each unit is mounted onto other devices.

Especially, in large scale environments such as public organizations, universities, and companies, numerous image forming apparatuses are being easily managed by using MPS (Managed Printing Services) methods. Integrated solution services where MPS methods are used include a charging function of calculating the use fee of consumables per group or individual and charging the fee accordingly, and a function of ascertaining the life span of a consumable and automatically ordering a new one before the consumable runs down. These functions are provided based on exact consumable use information.

For such information management, the main controller provided in the main body of an image forming apparatus and a memory provided in a consumable unit perform communication with each other. However, there may be numerous variables in the communication process. For example, there may be attacks by hackers trying to control the main controller or memory for malicious reasons. A consumable unit may be used too much even beyond the suitable replacing period, or may be refilled by a low quality consumable. Accordingly, the print quality of a script may deteriorate, and even cause breakdown or damage of the image forming apparatus.

SUMMARY

In an aspect of one or more embodiments, there is provided methods and apparatuses to resolve the aforementioned problems, that is to provide an image forming apparatus capable of effectively authenticating a consumable unit even when a $3^{rd}$ party hacked in, a CRUM chip of a consumable unit authenticated accordingly, and an authenticating method thereof.

According to an exemplary embodiment of the present disclosure, there is provided an image forming apparatus, including a consumable unit where a custom replaceable unit monitor (CRUM) chip is mounted; and a main body configured to perform at least one of a first authentication and a second authentication of the consumable unit, when the consumable unit is mounted, wherein the main body includes a main controller to perform the first authentication according to firmware stored in the image forming apparatus; and an authentication controller to use at least one ASIC (Application Specific Integrated Circuit) to perform the second authentication of the consumable unit.

The authentication controller may perform the second authentication separately from the first authentication performed by the main controller, and the main controller may perform communication with the CRUM chip, when both the first authentication and the second authentication succeed.

In addition, the main controller and the authentication controller may perform the first authentication and the second authentication, separately, when an event requiring performing an authentication is input, and the event may be an event where one of a power reset signal, replacement signal of the consumable unit, and an image forming job completion job is input.

The image forming apparatus may further include a system function controller configured to restrict functions of the consumable unit when at least one authentication of the first authentication and the second authentication fails.

The authentication controller may include an interface to receive authentication information including a first message authentication code (MAC) from the CRUM chip; an authentication processor configured to use the authentication information to generate a second MAC, and compare the first MAC with the second MAC to verify the CRUM chip; and a function restriction requester configured to transmit a function restriction request to the system function controller when the authentication of the CRUM chip fails.

The authentication processor may include an electronic signature verifier to verify an electronic signature included in the authentication information; a section key generator to generate a section key; a MAC generator configured to use the section key to generate the second MAC; and a MAC verifier configured to compare the second MAC with the first MAC, and to provide a result of comparison to the function restriction requester. In this case, each of the electronic signature verifier, section key generator, MAC generator, and MAC verifier may be the ASIC.

The CRUM chip may include an interface configured to be connected to the main controller; a memory to store information on the consumable unit; a CPU configured to be connected to the main controller through the interface, and to perform the first authentication between the CPU and the main controller; and an authentication ASIC configured to perform the second authentication between the authentication ASIC and the authentication controller. The CPU may update the information stored in the memory according to a signal transmitted from the main controller, when both the first authentication and the second authentication succeed.

The CRUM chip may include an interface configured to be connected to the main controller; a memory where the O/S of the CRUM chip is stored separately from the main body O/S of the image forming apparatus; and a CPU configured to use the O/S of the CRUM chip to perform the first authentication between the CPU and the main controller, and to perform the second authentication between the CPU and the authentication controller.

According to an exemplary embodiment of the present disclosure, there is provided a CRUM chip where a consumable unit of an image forming apparatus is to be mounted, the CRUM chip including an interface configured to be connected to the image forming apparatus; a memory to store information on the consumable unit; a central processing unit (CPU) configured to perform a first authentication in association with a main controller mounted on the image forming apparatus through the interface; and an authentication application specific integrated circuit (ASIC) configured to perform a second authentication in order to perform the second authentication in association with an authentication controller including at least one ASIC (Application Specific Integrated Circuit) mounted on the image forming apparatus.

The CPU may update information stored in the memory of the CRUM chip according to a signal transmitted from the main controller, when both the first authentication and the second authentication succeed.

According to an exemplary embodiment of the present disclosure, there is provided a custom replaceable unit monitor (CRUM) chip mountable on a consumable unit of an image forming apparatus, the CRUM chip including an interface configured to be connected to the image forming apparatus; a memory where an operating system (O/S) of the CRUM chip is stored separately from a main body O/S of the image forming apparatus; a central processing unit (CPU) configured to be connected to the image forming apparatus through the interface, use the O/S of the CRUM chip to perform a first authentication in association with a main controller mounted on the image forming apparatus through the interface, and configured to use the O/S of the CRUM chip to perform a second authentication in association with an authentication controller mounted on the image forming apparatus, wherein the main controller may perform the first authentication according to a firmware stored in the image forming apparatus, and wherein the authentication controller uses at least one ASIC (Application Specific Integrated Circuit) configured to perform the second authentication in order to perform the second authentication.

According to an exemplary embodiment of the present disclosure, there is provided a method for authenticating a consumable unit of an image forming apparatus, the method including determining whether or not an event requiring an authentication of a consumable unit mounted on the image forming apparatus occurred; performing a first authentication of the consumable unit according to software stored in the image forming apparatus by a main controller mounted on the image forming apparatus, when the event occurs; and performing a second authentication of the consumable unit separately from the main controller by an authentication controller comprising at least one ASIC (Application Specific Integrated Circuit).

The first authentication may be performed according to the software stored in the image forming apparatus, and the second authentication may be performed by at least one ASIC (Application Specific Integrated Circuit).

In addition, the event may be an event where at least one of a power reset signal, replacement signal of the consumable unit, and image forming job completion signal is input.

In addition, the performing the second authentication may include receiving authentication information comprising a first message authentication code (MAC) from the CRUM chip; generating a second MAC using the authentication information; and comparing the first MAC and the second MAC to authenticate the CRUM chip.

The authenticating a CRUM chip by comparing the first MAC and the second MAC may include verifying an electronic signature included in the authentication information using an electronic signature authentication ASIC; generating a section key using a section key generation ASIC, when the electronic signature is verified; generating the second MAC using the section key in a MAC generation ASIC; and comparing the second MAC and the first MAC in a MAC verification ASIC.

According to an exemplary embodiment of the present disclosure, there is provided a method for authenticating a consumable unit of an image forming apparatus, the method including determining whether or not an event requiring an authentication of a consumable unit mounted on the image forming apparatus occurred; performing a first authentication of the consumable unit by executing computer readable instructions stored in the image forming apparatus by a main controller mounted on the image forming apparatus, when the event occurs; and performing a second authentication of the consumable unit separately from the main controller by an authentication controller, which is a processing element separate from the main controller.

According to an aspect of one or more embodiments, there is provided at least one non-transitory computer readable medium storing computer readable instructions to implement methods of embodiments when executed by at least one processing element.

As aforementioned, according to various exemplary embodiments of the present disclosure, it is possible to effectively verify a consumable unit and a CRUM chip mounted on the consumable unit even when the main body of the image forming apparatus is hacked and thus a normal authentication is impossible, thereby significantly improving the security and safety of the image forming apparatus.

BRIEF DESCRIPTION OF THE DRAWINGS

The above and/or other aspects of embodiments will be more apparent and more readily appreciated from the following description, taken in conjunction with the accompanying drawings, in which:

FIG. 4 is a view illustrating an example of information to be stored in a CRUM chip;

DETAILED DESCRIPTION

Figure 1:
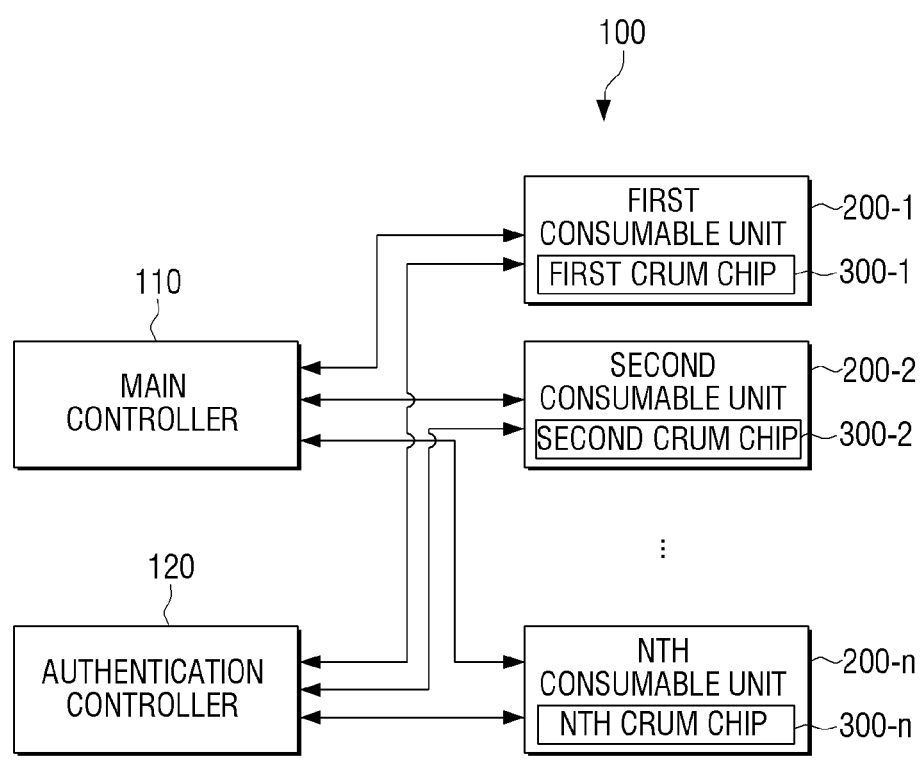
FIG. 1 is a block diagram of a configuration of an image forming apparatus according to an exemplary embodiment.

Reference will now be made in detail to embodiments, examples of which are illustrated in the accompanying drawings, wherein like reference numerals refer to the like elements throughout.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram illustrating a configuration of an image forming apparatus according to an exemplary embodiment of the present disclosure. According to FIG. 1, the image forming apparatus 100 includes a main controller 110, a main body comprising an authentication controller 120, and a plurality of consumable units 200-1~200-n. Each of the consumable units 200-1~200-n are mounted onto the main body and used, and when it is time for replacement, each consumable unit may be separated from the main body, and be replaced by a new unit.

The consumable units 200-1~200-n may be various types of units that are mounted onto the main body 100 of the image forming apparatus and get involved directly or indirectly in the image forming apparatus. For example, in the case of a laser image forming apparatus, electrification units, light exposure units, developing units, transcription units, settling units, various rollers, belts, OPC drums etc. may be consumable units. Besides these, various types of units that must be replaced in being used in an image forming apparatus may be defined as consumable units 200-1~200-n.

Due to differences in their usage, location of usage, and shape etc. of the consumable units 200-1~200-n, their life spans are differently determined. Therefore, for appropriate management of the consumable units 200-1~200-n, the consumable units 200-1~200n include CRUM chips (Customer Replaceable Unit Monitoring Chips) 300-1~300-n.

CRUM chips 300-1~300-n are configurations that are mounted onto each consumable unit to record various information. The CRUM chips 300-1~300-n include memories. Therefore, CRUM chips 300-1~300-n may be referred to as one of various names such as memory, CRUM memory (Customer Replaceable Unit Monitoring memory), and CRUM unit etc., but for brevity of explanation, in the present specification, they will be referred to as CRUM chips 300-1~300n.

In the memory provided in each CRUM chip 300-1~300-n, various feature information on consumable units 200-1~200-n mounted onto that CRUM chip 300-1~300-n, the CRUM chip 300-1~300-n itself, or the image forming apparatus 100 used in the consumable unit 200-1~200-n, and usage information or programs related to performing an image forming job may be stored. Detailed configuration and operations of the CRUM chips 300-1~300-n will be explained again hereinbelow.

The main body refers to a hardware for mounting various configuration elements. As aforementioned, each consumable unit 200-1~200-n may be mounted onto or detached from the main body without restriction. The main body performs at least one of a first authentication and second authentication regarding each consumable unit 200-1~200-n mounted onto it. The first authentication refers to an authentication performed by the main controller 110, while the second authentication refers to an authentication performed by the authentication controller 120 independently from the first authentication. According to an exemplary embodiment, both the first authentication and the second authentication may be performed, but there is no limitation thereto. For example, only a second authentication may be performed. The first authentication and second authentication may be performed when one of various events occurs for example, replacing a consumable unit, resetting the image forming apparatus, initiating or ending an image forming job, or when a predetermined time cycle arrived etc.

The main controller 110 performs a first authentication regarding the consumable unit 200-1~200-n. On the other hand, the authentication controller 120 performs a second authentication regarding the consumable unit 200-1~200n, separately from the main controller 110. These first and second authentications are processes for checking whether or not the consumable units 200-1~200n are normal consumable units. These authentications are performed between the CRUM chips 300-1~300-n mounted onto the consumable units 200-1-200n, and thus may be seen as authentications regarding the CRUM chips 300-1~300-n, but hereinafter explanation will be made on the case where the authentications are performed regarding the consumable units 200-1~200n.

When both the first and second authentications succeed, the main controller 110 determines that the corresponding consumable unit is a normal consumable unit. The main controller 110 may perform communication with the CRUM chips 300-1~300-n mounted on the consumable units 200-1~200-n that succeeded in the authentications, and provide various information to the CRUM chips 300-1~300-n or request for information. For example, when an image forming apparatus is completed, the main controller 110 may transmit information such as the number of pages printed in the image forming job, number of dots, printing time, user name, and document name etc. to the CRUM chips 300-1~300-n to be recorded in the memory inside. Otherwise, when a request signal requesting various information related to the image forming job is received from the CRUM chips 300-1~300-n, the main controller may transmit a message responding to that request signal. Such a communication message may be transceived as an encoded message. This will be explained in more detail hereinafter.

The first authentication may be a software authentication using software, and the second authentication may be a hardware authentication using hardware. That is, the main controller 110 may perform a first authentication according to a firmware stored in the image forming apparatus 100. On the other hand, the authentication controller 120 includes at least one ASIC (Application Specific Integrated Circuit) designed for the purpose of performing a second authentication. The authentication controller 120 may perform a second authentication using the ASIC (Application Specific Integrated Circuit).

If a $3^{rd}$ party hacked in the firmware or O/S, others, or software used by the main controller 110, the first authentication performed by software may be omitted, detoured, or processed to have succeeded right away. However, the second authentication performed separately from the first authentication is a hardware authentication, and thus even when there is a firmware hacking, the second authentication cannot be detoured. Accordingly, in abnormal cases, the second authentication performed in the authentication controller 120 will be processed as being a failure.

When either one of the first authentication and second authentication is processed as being a failure, the main controller 110 restricts the functions of the corresponding consumable unit. Restriction on the functions may be made in various ways. For example, various actions may be made such as reduction of output speed of using the consumable unit, stopping output, outputting white or black paper, reducing toner concentration, changing settling temperature, and outputting warn message etc. Of these actions, two or more can be made at the same time. For example, the main controller 110 may restrict the use on the consumable unit which failed authentication while providing a notice message regarding the restricted consumable unit from a host apparatus connected to the main body or image forming apparatus 100.

Figure 2:
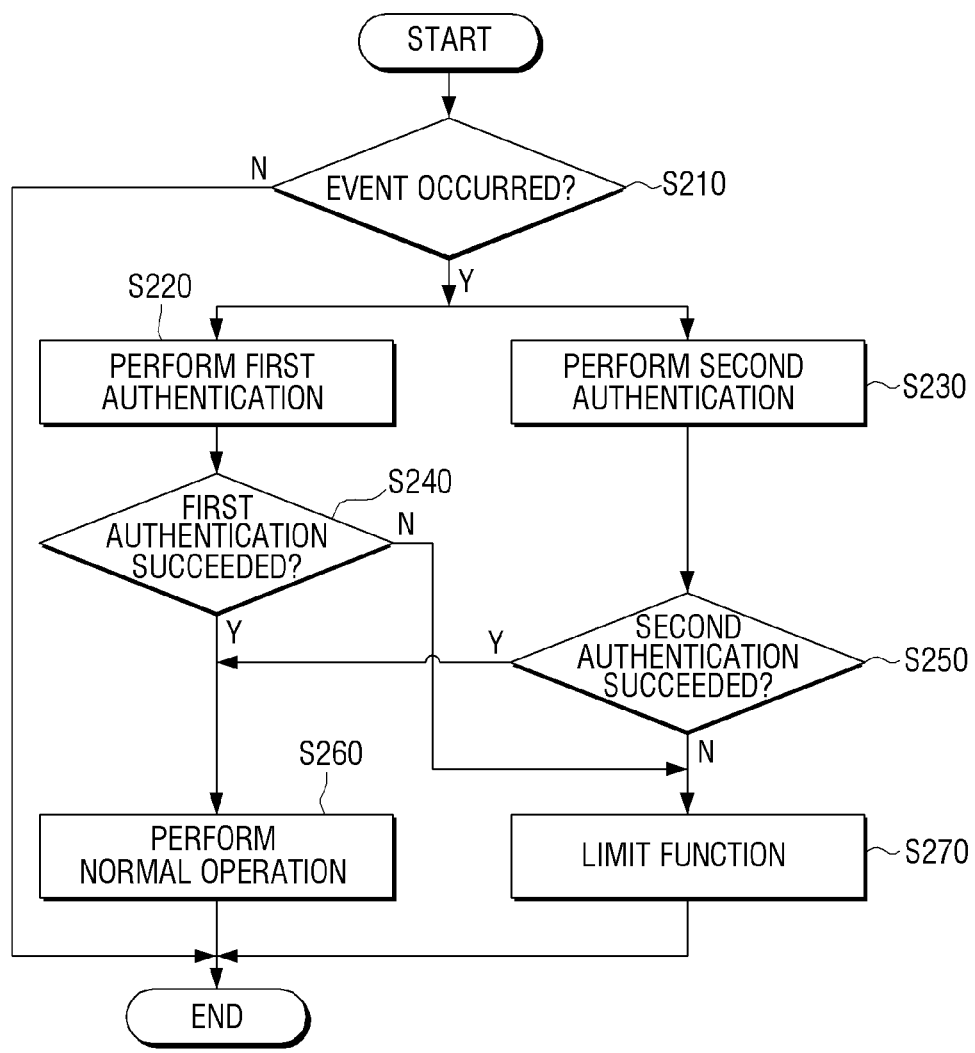
FIG. 2 is a flowchart for explaining a method for authenticating a consumable unit of an image forming apparatus according to an exemplary embodiment.

FIG. 2 is a flowchart for explaining a method for authenticating a consumable unit of an image forming apparatus according to an exemplary embodiment of the present disclosure. According to FIG. 2, when an event that requires authentication occurs (S210), the image forming apparatus 100 may perform a first and second authentication separately (S220, S230). FIG. 2 illustrates that a first and second authentication are performed in parallel, but they may also be performed sequentially. For example, a second authentication may be performed first, and if it succeeds, then a first authentication may be performed, and vice versa.

When the main controller 110 performing a first authentication succeeds in the first authentication (S240), it determines that the consumable unit is at a normal state, and performs a normal operation (S260). On the other hand, when the main controller 110 fails (S240), it restricts the functions of the corresponding consumable unit (S270). The method of restricting the functions was explained in detail hereinabove, and thus repeated explanation is omitted.

When the authentication controller 120 that performs a second authentication succeeds in the second authentication (S250), it determines that the consumable unit is at a normal state, and performs a normal operation (S260). On the other hand, when the authentication controller 120 fails in the second authentication (S250), it restricts the functions of the corresponding consumable unit (S270).

Either the main controller 110 or authentication controller 120 may restrict the functions of the consumable unit. In the case of restricting outputting using the consumable unit itself, even when there is data to print, a printing operation will not be proceeded, and an error message may be output to the user.

Figure 3:
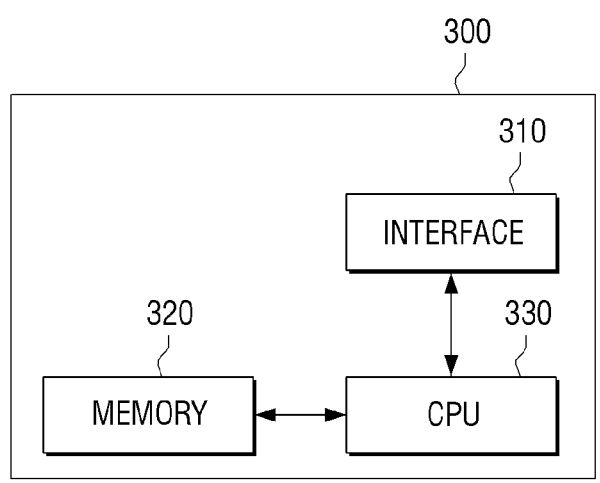
FIG. 3 is a block diagram illustrating a configuration of a CRUM chip according to an exemplary embodiment.

FIG. 3 is a block diagram illustrating a configuration of a CRUM chip according to an exemplary embodiment of the present disclosure. According to FIG. 3, the CRUM chip 300 includes an interface 310, memory 320, and CPU 330.

The interface 310 is a configurative element for connecting communication with the main controller mounted onto the main body of the image forming apparatus 100. The interface 310 may be connected to the main controller according to a wireless communication standard such as Bluetooth, Wifi, Zigbee, or NFC (Near Field Communication), or by a serial interface such as I2C (Inter Integrated Circuit) interface.

The memory 320 may store various information related to the consumable units. More specifically, various information such as feature information, information on usage etc. may be recorded in the memory 320. Feature information refers to information on the characteristics of the consumable unit or CRUM chip. More specifically, feature information may include information on the manufacturer of the consumable unit 200, information on the manufacturer of the image forming apparatus, apparatus names of mountable image forming apparatuses, information on the manufactured date, serial number, model name, electronic signature information, encode key, and encode key index etc. Otherwise, feature information may be referred to as unique information or identification information. Information on usage refers to information related to the state of usage of the consumable unit. More specifically, information on usage may include information on how many pages were printed using the consumable unit, how many more pages can be printed, and how much toner is left etc.

FIG. 4 is an example of a database of information being stored in the memory 320. As illustrated in FIG. 4, in the memory 320 of the CRUM chip 330, not only general information such as the version of the consumable unit 200, serial number, set model name, and service initiation date etc., but also various option information such as RAM size and EEPROM size, information related to the lift span of the consumable unit, feature information on the consumable unit, information on features of the consumable unit, color menu, and set-up menu etc. may be stored and managed in the CRUM chip 300.

In addition, in the memory 320, various programs that can be executed by the CPU 330 may be stored. More specifically, programs that may be stored in the memory 320 may include not only general applications but also O/S (Operating System) programs, initialization programs, and encoding programs etc. These O/S programs, initialization programs, and encoding programs may be provided separately from the O/S programs, initialization programs, and encoding programs that are used in the main body of the image forming apparatus 100 and stored in the memory 320.

In the case of an exemplary embodiment where the CRUM chip 300 is embodied to have an O/S for itself, the CPU 330 may perform a first and second authentication using the O/S between itself and the image forming apparatus.

More specifically, being connected to the main controller 110 via the interface 310, when an authentication event occurs, the CPU 330 performs a first authentication between itself and the main controller 110. In addition, it performs a second authentication between itself and the authentication controller 120. Herein, an authentication event refers to a state where the conditions for authenticating the consumable unit 200 are satisfied. More specifically, an authentication event may be when the image forming apparatus is turned off and then turned on, when an image forming job is completed, or when the consumable unit is replaced. Otherwise, when a predetermined time period arrived may be an authentication event as well.

When such a situation occurs, the main controller 110 and authentication controller 120 performs a first and second authentication, respectively.

The first and second authentication may be processed according to various exemplary embodiments. For example, in the case of a first authentication, the main controller 110 encodes a signal for authentication and transmits the encoded signal to the CRUM chip 210. In the signal being transmitted, any value R1 may be included. Herein, R1 may be a random value that is randomly generated and changed at every authentication, or a predetermined fixed value.

The interface 310 of the CRUM chip 300 that received the signal transmits the received signal to the CPU 330.

The CPU 330 uses a random value R2 and the received R1 to generate a section key. The section key refers to an encoding key to be used for one communication section only. The CPU 300 uses the section key and an encoding algorithm to encode a random data and generate a MAC (Message Authentication Code). Herein, in the encoded data, various information on the consumable unit 220 or CRUM unit 300 may be included, for example, electronic signature information, unique serial number etc. For brevity of explanation, the MAC generated the foremost will be referred to as a first MAC.

The CPU 330 transmits to the main controller 110 the signal wherein the first MAC has been combined with the data including R2. Herein, R2 may be a value randomly generated by the CPU 330, or a randomly fixed value. The main controller 110 uses the received R2 and R1 to generate a section key, and uses the generated section key to generate a second MAC. In addition, the main controller 110 compares the generated second MAC with the first MAC included in the received signal to authenticate the CRUM chip 330. As such, the CPU 330 uses the OS to perform an operation of generating R2, operation of generating a section key, operation of generating a first MAC, and operation of transmission, in a consecutive order, thereby completing the first authentication. According to various exemplary embodiments, in such an authentication process, an electronic signature or key information may be transceived and used in the authentication process.

The second authentication may also be embodied in the same process as the first authentication. The operations corresponding to the aforementioned main controller 110 may be performed in various ASICs or logic circuits within the authentication controller 120. Some of the operations may be performed in the DSP (Digital Signal Processor).

According to an exemplary embodiment, the second authentication and first authentication may be embodied in different processes from each other. For example, the second authentication may be performed in a shorter process than the first authentication.

In addition, the encoding algorithm used in the first and the second authentications may also be embodied in the same manner or differently from each other. More specifically, in the first and second authentications, various encoding algorithms such as RSA, ECC asymmetric algorithm, ARIA, TDES, SEED, AES symmetric key algorithm etc. may be used. These encoding algorithms may be changed when an encoding key has been exposed or when the security needs to be reinforced. Detail explanation on the authentication procedure in the main controller 110 and authentication controller 120 will be made hereinafter.

When the first and second authentications are all completed, the CPU 330 of the CRUM chip performs data communication between itself and the main controller 110.

Otherwise, the CPU 330 may execute the O/S or the initialization program stored in the memory of the CRUM chip 300, and perform initialization of the CRUM chip 300 or consumable unit 200 itself separately from the initialization of the image forming apparatus. The aforementioned first and second authentications may be performed while the initialization is being made, or after the initialization is completed.

When the authentications are completed, the CPU 330 may perform encoding data communication between itself and the main body of the image forming apparatus. In this case, various commands and data transmitted from the image forming apparatus may be encoded according to any encoding algorithm and be transmitted.

In the case where the CPU 330 uses the O/S of itself as in the exemplary embodiment explained by FIG. 3, the CPU 330 uses the encoding algorithm stored in the memory 320 to perform encoding data communication in association with the main controller 110. When a user command is input or an image forming job is initiated or completed, the main controller 110 encodes the commands or data for performing operations such as data reading, writing, or adding using the encoding algorithm, and then transmits the encoded result to the CRUM chip 300.

The interface 310 of the CRUM chip 300 transmits the received commands or data to the CPU 330. The CPU 330 decodes the received commands or data, and performs operations such as data reading, writing etc. corresponding to those commands.

Figure 5:
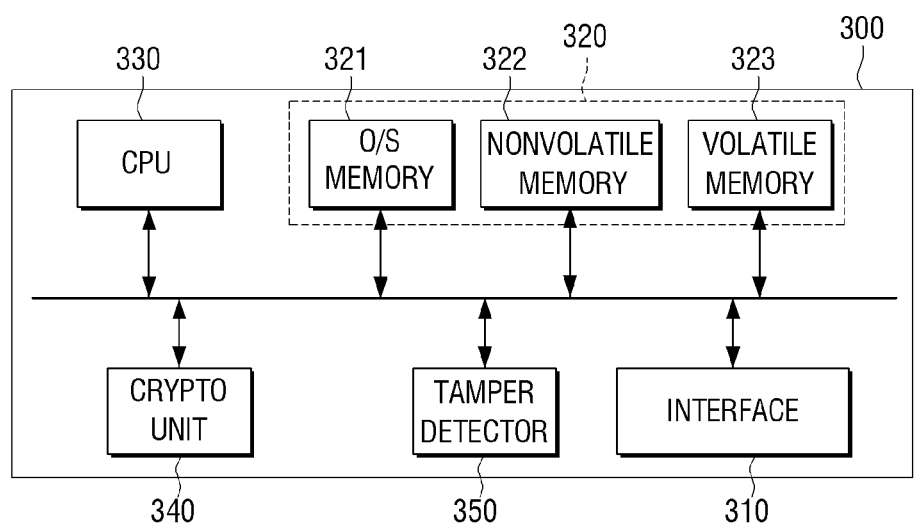
FIG. 5 is a block diagram illustrating an example of a detailed configuration of a CRUM chip.

FIG. 5 illustrates an example of a detailed configuration of a CRUM chip 300 according to an exemplary embodiment of FIG. 3. According to FIG. 5, the CRUM chip 300 may include a Crypto unit 340, tamper detector 350, besides the interface 310, memory 320 and CPU 330.

In addition, although not illustrated in FIG. 5, in the CRUM chip 300, a cluck (not illustrated) for outputting a cluck signal, or a random value generator (not illustrated) for generating a random value for authentication may be further included. Besides, some configurative elements may be omitted from FIG. 5, or modified or added thereto.

The Crypto unit 340 supports the encoding algorithm to enable the CPU 330 to perform an authentication or an encoded communication between itself and the main controller 110. More specifically, the Crypto unit 340 may use various encoding algorithms according to the control by the CPU 330 to perform encoding or decoding, and provide the result to the CPU 330. More specifically, one of various encoding algorithms such as RSA, ECC asymmetric algorithm, ARIA, TDES, SEED, AES symmetric key algorithm etc. may be used.

The tamper detector 350 is a unit for defending various physical hacking attempts, that is tampering. More specifically, it may monitor operation environments of voltage, temperature, pressure, light, and frequency etc., and when there is an attempt such as Decap, the tamper detector 350 may delete or physically damage the data stored in the memory 320. The tamper detector 240 may be provided with an additional power.

As such, having the Crypto unit 240 and tamper detector 350 may reinforce the security on the CRUM chip 300 itself.

According to FIG. 5, the memory 320 may include at least one of the O/S memory 321, nonvolatile memory 322, and volatile memory 323.

The O/S memory 321 stores the O/S that operates the CRUM chip 300 of the consumable unit 200. The nonvolatile memory 322 stores various nonvolatile data. The nonvolatile memory 121 may not only store various information explained in FIG. 4, but also electronic signature information, various encoding algorithm information, or encoding key values etc. The volatile memory 323 may be used as a temporary storage space necessary for the operation. The CPU 330 may copy various programs in the volatile memory 323, and execute the copied programs to perform various operations. For example, section keys or data such as MAC generated in the process of performing the first and second authentications may be temporarily stored in the volatile memory 323.

In FIG. 5, it is illustrated that the O/S memory 321, nonvolatile memory 322, volatile memory 323 are stored in the memory 320, but some of them may be disposed outside the CRUM chip 300.

In FIG. 5, the configurative elements are connected to one another via buses. However, this is just an exemplary embodiment, and the configurative elements may be directly connected to one another instead of using buses.

Figure 6:
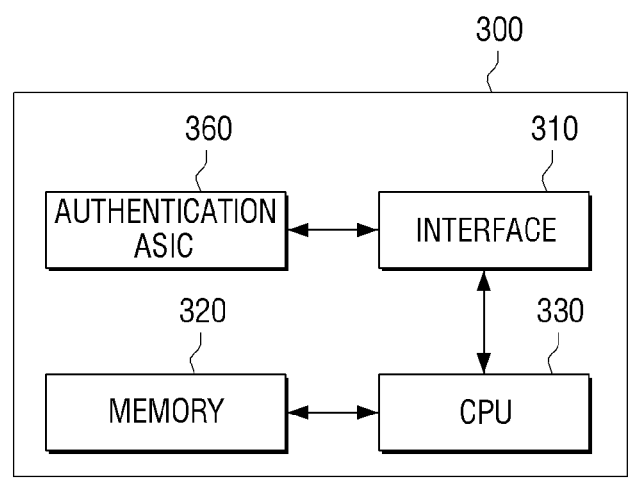
FIG. 6 is a block diagram illustrating a configuration of a CRUM chip according to an exemplary embodiment.

FIG. 6 is a block diagram illustrating a configuration of a CRUM chip 300 according to an exemplary embodiment of the present disclosure. According to FIG. 6, the CRUM chip 300 includes an interface 310, memory 320, CPU 330, and authentication ASIC 360.

The interface 310 is a configurative element for connecting communication between itself and the main controller 110.

The memory 320 is a configurative element for storing various information and programs as aforementioned. Unlike the exemplary embodiment of FIG. 3, an O/S may not be stored in the memory 320. That is, the CPU 330 may execute the program stored in the memory 320 without O/S, and perform a first authentication with the main controller 110.

The authentication ASIC 360 is a configurative element for performing a second authentication between itself and the authentication controller 120 generated in the main body of the image forming apparatus 100. The authentication ASIC 360 may consist of at least one ASIC for realizing the specific process of the second authentication.

More specifically, assuming a case where the second authentication is performed as in the aforementioned method, the authentication ASIC 360 may include a first ASIC which generates R2 when an authentication request is received from the main controller 110, a second ASIC that generates a section key using the R1 and R2 transmitted from the main controller 110, a third ASIC that generates a first MAC using the generated section key and encoding algorithm, and a fourth ASIC that transmits the generated second MAC and R2 to the main controller through the interface 310. Accordingly, the first and second authentications may be performed separately between the authentication ASIC 360 and the main controller, even without an expensive CPU 330 or OS.

Also in the present exemplary embodiment, when the first and second authentications are completed, the CPU 330 may perform encoding data communication with the main controller 110, record the received signals to the memory 320, and read the data requested by the main controller 110 from the memory 320, and transmit the read data to the main controller 110.

The consumable unit 200 may be attached to or detached from the main body of the image forming apparatus 100. When attaching the consumable unit 200, it must be electrically connected to the main body. Such a connection may be embodied as either a contact type or connector type.

Figure 7:
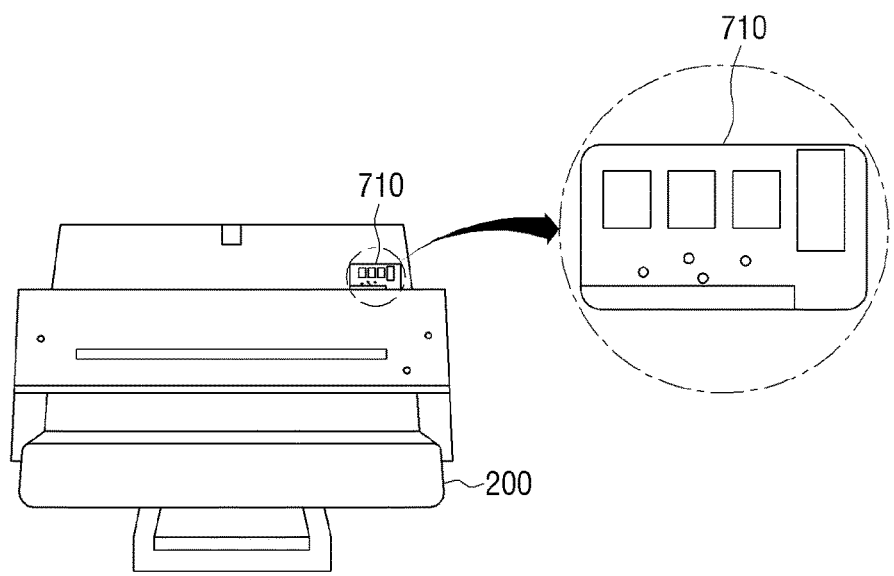
FIGS. 7 and 8 are views for explaining various methods for mounting a consumable unit onto an image forming apparatus.

FIG. 7 illustrates a configurative example of the exterior of a consumable unit 200 embodied as a contact type. According to FIG. 7, the consumable unit 200 includes a contact point 710 for communication. FIG. 7 illustrates a case of using a I2C interface where four contact terminals are used. Also in the main body of the image forming apparatus 100, there is provided a contact point of the same shape as the contact point 710. When the consumable unit 200 is mounted onto the main body 100, the contact point 710 may contact the contact point provided in the main body 100 of the image forming apparatus. When the contact signal is received from the contact point, the main controller 110 and authentication controller 120 of the image forming apparatus 100 may determine that an authentication event occurred requiring a first and second authentication.

Figure 8:
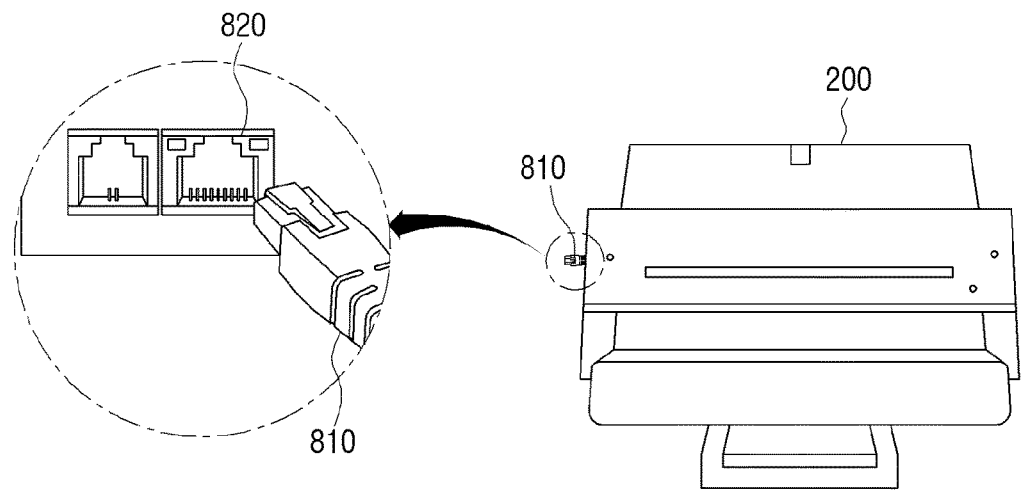

FIG. 8 illustrates a configurative example of the exterior of the interface 810 made in a connector type. According to FIG. 8, the consumable unit 200 includes an interface 810 where a connector 820 may be connected. The connector 820 is connected to a port (not illustrated) provided in the main body 100 of the image forming apparatus. When a connecting signal of the connector 820 is received through the port, the main controller 110 and authentication controller 120 of the image forming apparatus 100 may determine that an authentication event occurred requiring a first and second authentication.

Such a consumable unit 200 and CRUM chip 300 may be configured in one of various formats, and may perform a first and second authentication as aforementioned in association with the main controller 110 and authentication controller 120.

Figure 9:
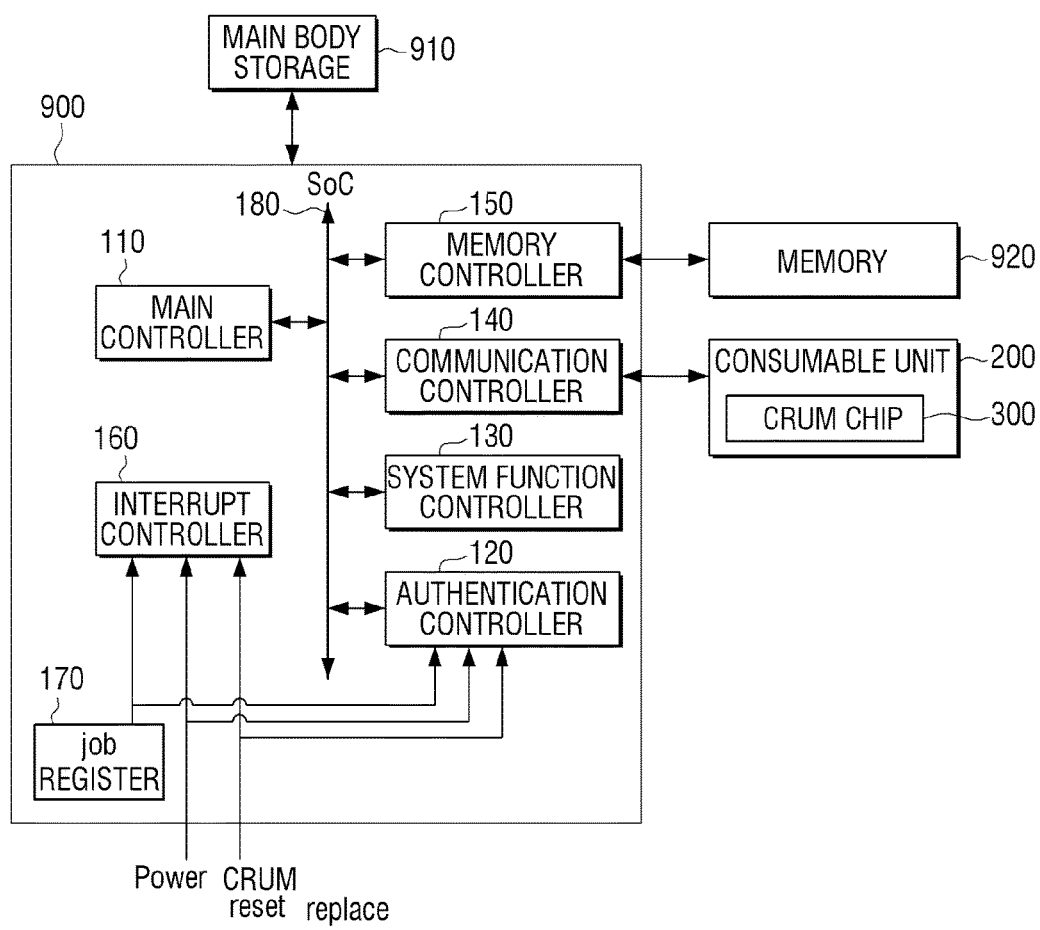
FIG. 9 is a view illustrating an example of a detailed configuration of an image forming apparatus.

FIG. 9 is a block diagram illustrating a configurative example of an image forming apparatus according to an exemplary embodiment of the present disclosure.

The image forming apparatus 100 includes an SoC (System on Chip) 900, main body storage 910, and memory 920. The SoC 900 includes a main controller 110, authentication controller 120, system function controller 130, communication controller 140, memory controller 150, interrupt controller 160, job register 170, and bus 180.

The memory 920 may include a RAM or ROM, EFUSE memory, and flash memory etc. In the memory 920, various data such as command sets for system booting, encoding algorithm, encoding key etc. may be stored.

The memory controller 150 is a configurative element for controlling reading or writing operations regarding the memory 920 such as the RAM or ROM inside the image forming apparatus 100. The memory controller 150 may provide the data read from the memory 920 to each configurative element inside the SoC 900 through the bus 180.

The communication controller 140 is a configurative element for performing communication with each configurative element inside the image forming apparatus 100 including the consumable unit 200. The communication controller 140 may perform communication in various communication methods as aforementioned. The communication controller 140 may transmit the data output from the main controller 110 or authentication controller 120 to the CRUM chip 300, and provide the data input from the CRUM chip 300 to the main controller 110 or authentication controller 120.

The system function controller 130 is a configurative element for restricting each configurative element inside the image forming apparatus including the consumable unit 200. For example, if any one authentication of the first and second authentication of the consumable unit 200 fails, the system function controller 130 may transmit an inactivating signal regarding the CRUM chip 300 of the corresponding consumable unit 200 to block access to the consumable unit 200, or isolate the power supplied to the consumable unit 200.

In the main body storage 910, document data used in the image forming job, job history, and various data such as version information etc. regarding the consumable unit and various programs may be stored.

The main controller 110 and authentication controller 120 may each perform a first and second authentication, respectively, when an authentication event occurs as aforementioned. As aforementioned, an authentication event may be when the image forming apparatus is turned on or reset, when an image forming job is completed, or when the consumable unit is replaced. That is, the event may be an event where one of power rest signal, replacement signal of the consumable unit, and image forming job completion signal etc. is input.

The main controller 110 and authentication controller 120 may determine whether or not an authentication event occurred depending on the power reset signal or CRUM replacement signal etc. input into the SoC 900. For example, a power reset signal may be input in the SoC 900 through a power button, or a CRUM replacement signal may be sensed by the connector between the CRUM unit and then input in the SoC 900. In addition, when an image forming job such as printing, scanning, copying, fax outputting etc. is completed, the fact that such an image forming job has been completed may be recorded in the job register 170.

The authentication controller 120 performs the second authentication when a power reset signal or a CRUM replacement signal is input, or when the fact that a job has been completed is recorded in the job register 170.

The interrupt controller 160 transmits an interrupt signal to the main controller 110 when a power reset signal or a CRUM replacement signal is input, or when the fact that a job has been completed is recorded in the job register 170. The main controller 110 performs the first authentication regarding the consumable unit when the interrupt signal is received.

Figure 10:
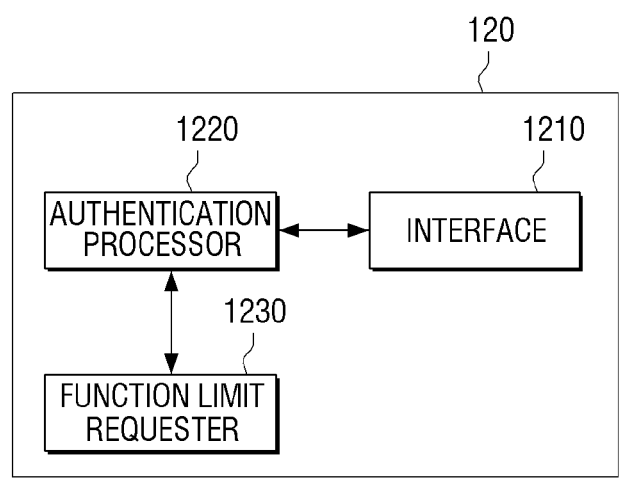
FIG. 10 is a view illustrating an example of a configuration of an authentication controller.

FIG. 10 is a block diagram illustrating an example of a configuration of an authentication controller 120. According to FIG. 10, the authentication controller 120 includes an interface 1210, authentication processor 1220, and function restriction requester 1230.

The interface 1210 is a configurative element for receiving authentication information from the CRUM chip 300. Authentication information may include various information such as unique information allocated to the consumable unit 200 or CRUM chip 300, and MAC (Message Authentication Code). That is, when an authentication event occurs, the main controller 110 or authentication controller 120 may generate an authentication request and transmit it to the CRUM chip 300. When the authentication request is received, the CRUM chip 300 may generate a MAC and transmit authentication information including the generated MAC to the main body of the image forming apparatus 100. When generating a MAC, the R1 value provided by the main controller 110 or authentication controller 120 and the R2 value generated by the CRUM chip 300 itself may be used. The CRUM chip 300 may include R2 value into the authentication information as well and transmit it. The transmitted authentication information may be provided not only to the main controller 110 but also to the authentication controller 120. For brevity of explanation, the MAC transmitted from the CRUM chip 300 may be referred to as the first MAC.

When the authentication information including the first MAC is received in the interface 1210 of the authentication controller 120, the authentication processor 1220 generates a second MAC by itself. To generate the second MAC, R1 value and R2 value may be used.

When the second MAC is generated, the authentication processor 1220 may compare the first MAC with the second MAC and verify the consumable unit. That is, when the two MACs correspond to each other, the consumable unit 300 may be determined as an original product, whereas when the two MACs do not correspond to each other, the consumable unit 300 may be determined as a nonoriginal product. The authentication processor 1220 provides the result of verification to the function restriction requester 1230.

When authenticating the consumable unit 300 fails, the function restriction requester 1230 may transmit the function restriction request to the system function controller. Accordingly, use of the consumable unit 300 may be prevented or restricted.

Figure 11:
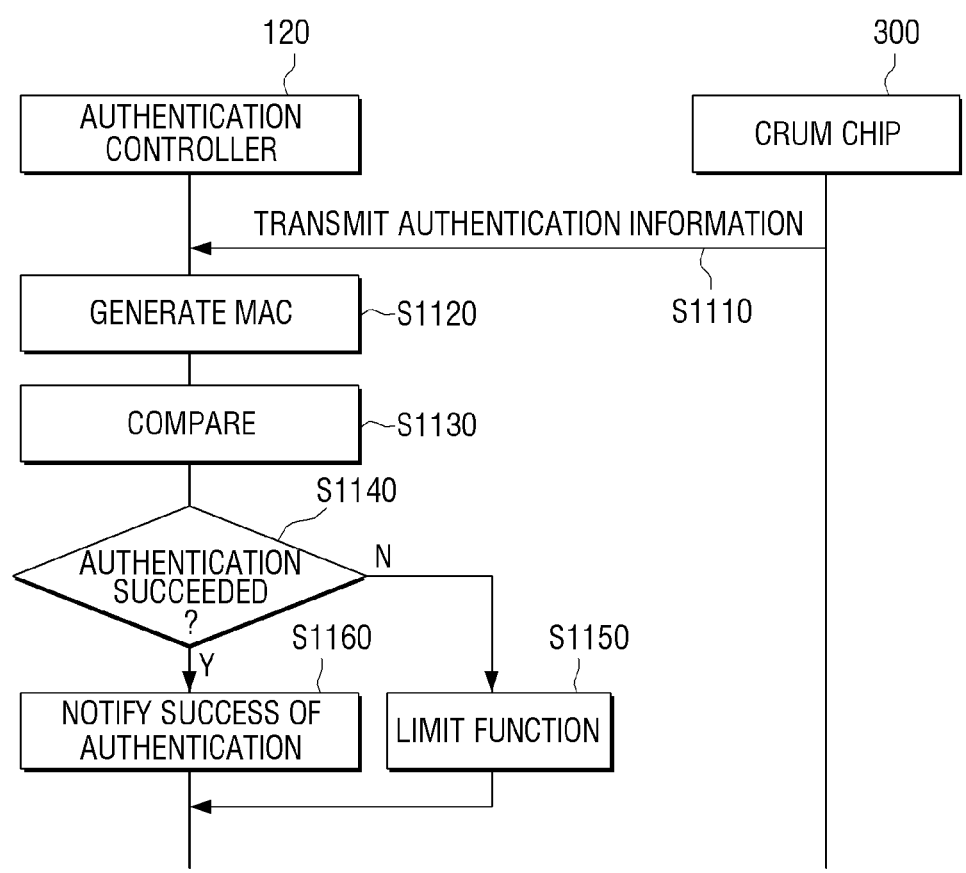
FIG. 11 is a timing view for explaining a second authentication performed by an authentication controller and CRUM chip.

FIG. 11 is a flowchart for explaining the authentication process between the authentication controller 120 and CRUM chip 300.

According to FIG. 11, the CRUM chip 300 may transmit various authentication information (S1110).

FIG. 11 illustrates starting from the step of transmitting by the CRUM chip 200 authentication information, but the second authentication may be initiated by the authentication controller 120. That is, the authentication controller 120 may transmit various information necessary for the authentication to the CRUM chip 300. The CRUM chip 300 generates a first MAC based on the transmitted information, and transmits various information necessary for generating a MAC and authentication information including the first MAC to the controller 120 (S1120).

In the authentication controller 120, after a MAC is generated using the transmitted authentication information, the received MAC, that is the first MAC is compared to the generated MAC, that is the second MAC (S1130).

When determined as corresponding to each other after comparison, the authentication controller 120 determines that the authentication succeeded (S1140). When it is determined that the authentication succeeded, the authentication controller 120 may notify the main controller 110 of the fact of success (S1160). On the other hand, when the authentication fails, it is possible to request for a function restriction to the system function controller 130, so as to restrict the functions of the consumable unit 300 (S1150).

Figure 12:
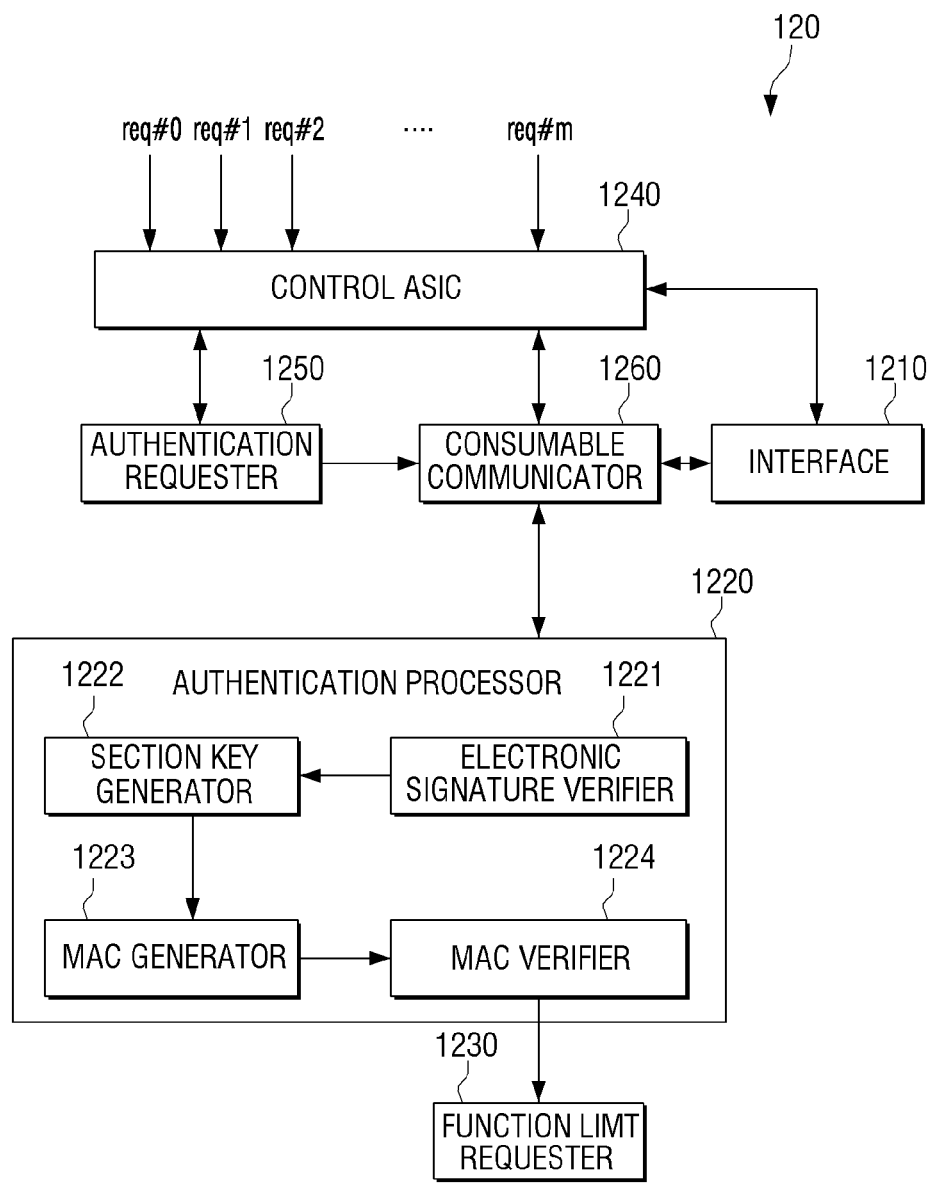
FIG. 12 is a view illustrating an example of a configuration of an authentication controller.

FIG. 12 is a block diagram illustrating an example of a detailed configuration of an authentication controller 120. According to FIG. 12, the authentication controller 120 includes a control ASIC 1240, authentication requester 1250, consumable unit communicator 1260, interface 1210, authentication processor 1220, and function restriction requester 1230.

The control ASIC 1240 is a configurative element which recognizes that various signals (req #1~req # m) such as a reset signal, CRUM replacement signal, job end signal etc. have been input, and initiates a second authentication. When such a signal is input, the control ASIC 1210 outputs a control signal to the authentication requester 1250. In an authentication request signal, various information may be included. For example, R1 value generated in the control ASIC 1240, authentication document issued for the consumable unit 200, and the key index etc. may be included in the authentication request signal.

When an authentication request signal is input, the consumable unit communicator 1260 transmits the authentication request signal received to the CRUM chip 300 through the interface 1210 and the bus 180 which connects the interface 1210. In addition, the consumable unit communicator 1260 may receive various information transmitted from the CRUM chip 300 through the interface 1210. The received information may be provided to the authentication processor 1220.

The authentication processor 1220 includes an electronic signature verifier 1221, section key generator 1222, MAC generator 1223, and MAC verifier 1224.

The electronic signature verifier 1221 is a configurative element for verifying the electronic signature included in the authentication information. That is, according to the present exemplary embodiment, the CRUM chip 300 uses the section key to encode the uniquely stored electronic signature information, generates the first MAC, and transmits authentication information including the first MAC.

The electronic signature verifier 1221 detects the electronic signature included in the authentication information, and compares it with the prestored electronic signature. If the electronic signature corresponds to the prestored electronic signature, the electronic signature verification is completed. On the other hand, if the electronic signature does not correspond to the prestored electronic signature, the second authentication is processed to have failed. When the electronic signature does not correspond to the prestored electronic signature, the electronic signature verifier 1221 notifies the function restriction requester 1230 of the authentication failure, and restricts the functions of the consumable unit 200.

The section key generator 1222 is a configurative element for generating a section key after the electronic signature verification is completed. As aforementioned, a section key refers to an encoding key temporarily used during one communication section. The section key generator 1222 uses the symmetric encoding algorithm to encode the R1 value and R2 value with the symmetric key, and generates the section key. As aforementioned, R1 is the value transmitted to the CRUM chip 300, while R2 is the value transmitted from the CRUM chip 300.

The MAC generator 1223 uses the generated section key to generate a MAC. For brevity of explanation, the generated MAC is referred to as the second MAC.

The MAC verifier 1224 compares the second MAC generated in the MAC generator 1223 with the first MAC transmitted from the CRUM chip 300, and checks whether or not they correspond to each other. The result of comparison is provided to the function restriction requester 1230. Accordingly, when verification of MAC fails in the second authentication, the functions of the consumable unit 200 are restricted.

In FIG. 12, it is illustrated that a control ASIC 1240 is an ASIC, but any of an authentication requester 1220, consumable unit communicator 1230, interface 1240, authentication processor 1250, function restriction requester 1260 etc. may obviously be embodied as an ASIC. For example, the authentication processor may be embodied as an electronic signature verification ASIC, section key generation ASIC, MAC generation ASIC, and MAC verification ASIC etc. In addition, some of the configurative elements may be embodied as a DSP or a general logic circuit.

Figure 13:
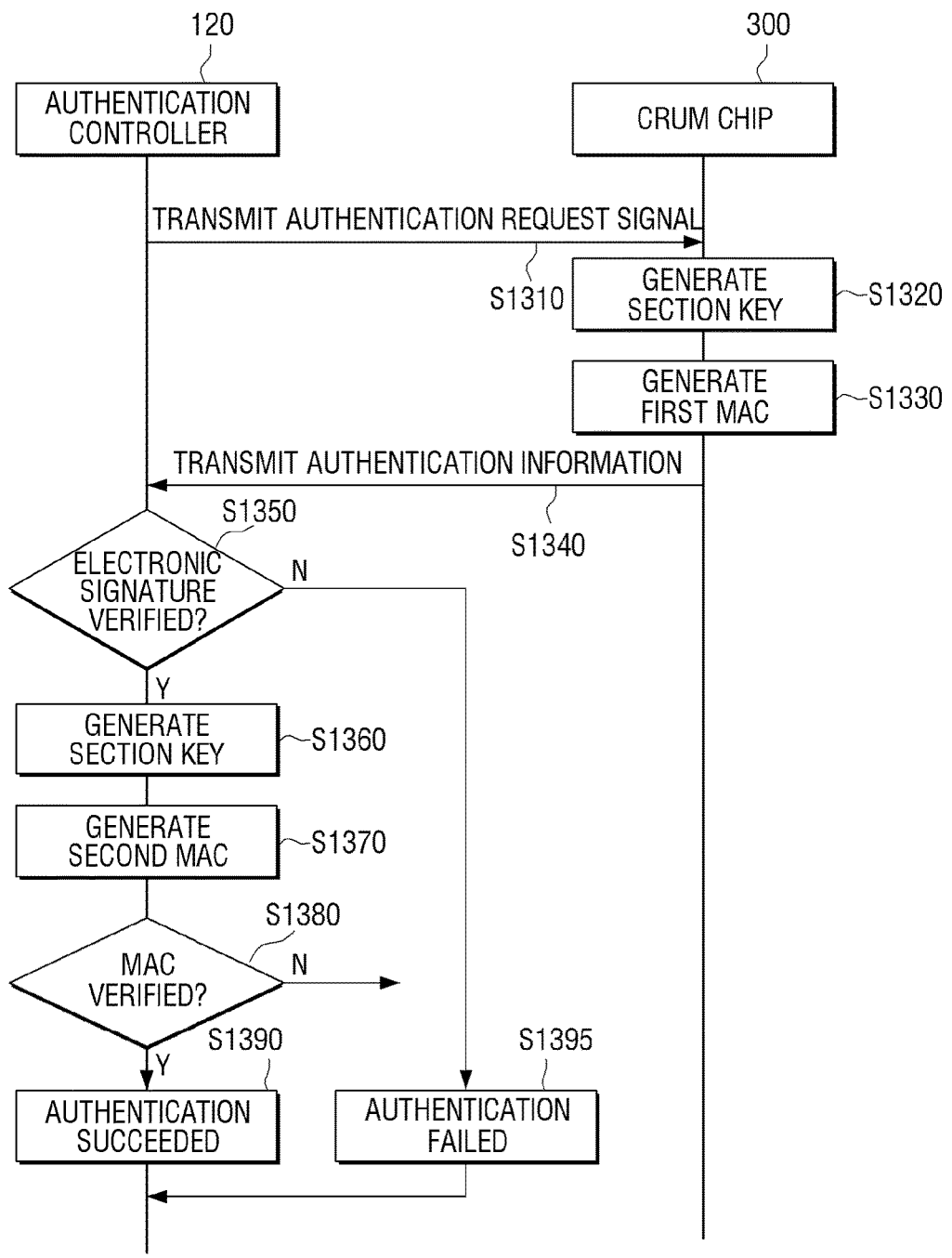
FIG. 13 is a timing view for explaining in further detail a method for authenticating a consumable unit according to an exemplary embodiment.

FIG. 13 is a timing view for explaining a process of authentication between the authentication controller 120 and CRUM chip 300 according to an exemplary embodiment of the present disclosure. According to FIG. 13, when an authentication event occurs, the authentication controller 120 may transmit an authentication request signal (S1310).

When an authentication request signal is received, the CRUM chip 300 may generate a section key (S1320). More specifically, when an authentication request signal is received, the CRUM chip 300 generates R2 value. In addition, the CRUM chip 300 may detect a key index included in the authentication request signal, and detect a key corresponding to the key index from the key matrix stored. The CRUM 300 may use the symmetric key encoding algorithm to encode R1 and R2 values with the detected keys and generate a section key. Herein, R1 may be included in the authentication request signal and be received.

When a section key is generated, the CRUM chip 300 may generate a first MAC (S1330). More specifically, the CRUM chip 300 may use the asymmetric key encoding algorithm to encode electronic signature information or other identification information with the section key to generate a first MAC. The CRUM chip 300 may transmit the authentication information where the generated first MAC and the data to be transmitted are combined to the authentication controller 120 (S1340).

By an example, a verification key may be used instead of the electronic signature information. For example, the CRUM chip 300 may scramble the unique authentication document regarding the consumable unit 200 or unique information such as the serial number using R1 and R2 values to generate a verification key. The CRUM chip 300 may encode the generated verification key with the section key to generate a first MAC, and combine the first MAC with the verification key and other information, and then transmit the authentication information to the authentication controller 120. Additional illustration and explanation on such examples are omitted.

When the authentication information is transmitted (S1340), the authentication controller 120 detects the electronic signature included in the authentication information, and compares it with the prestored electronic signal, and performs a verification (S1350). If the electronic signature does not correspond as a result of verification, it is processed as an authentication failure (S1395). Accordingly, the functions of the consumable unit are restricted.

If the verification on the electronic signature succeeds, the authentication controller 120 generates a section key. More specifically, it is possible to apply a symmetric key encoding algorithm regarding the R1 already generated in the authentication controller 120 and the R2 included in the authentication information received from the CRUM chip 300 to generate a section key (S1360). In this case, a key may be used corresponding to the key index included in the authentication request signal transmitted to the CRUM chip 300.

When a section key is generated, the authentication controller 120 uses the generated section key to generate a second MAC (S1370). More specifically, it is possible to use an asymmetric encoding algorithm to encode the received electronic signal information with the section key and generate a second MAC. Then, the authentication controller 120 compares the second MAC and the first MAC to verify the first MAC (S1380).

When the first MAC is verified, the authentication controller 120 processes as an authentication success (S1390). Accordingly, an image forming job using the consumable unit may be performed without restriction.

In FIG. 13, an explanation is made based on the case of using electronic signature information, but a verification key or other data may be used besides the electronic signature information. In addition, in FIGS. 12 and 13, an explanation is made on the second authentication, but such an authentication method may also be performed in the same manner in the first authentication as well.

In addition, the operations of the CRUM chip 300 explained in FIGS. 12 and 13 may be performed in the CPU 330 or in the authentication ASIC 360 depending on the exemplary embodiments.

The explanation above is made on the first and second authentications using MAC, but there is no limitation thereto. For example, the first authentication or second authentication may each consist of a plurality of authentication steps.

When both the first and second authentications succeed as aforementioned, the image forming apparatus 100 may use the consumable unit 200 to perform various jobs. When the performing of a job is completed, the image forming apparatus 100 may perform data communication between itself and the consumable unit 200. More specifically, encoding data communication may be performed between the main controller 110 mounted on the image forming apparatus 100 and the CRUM chip 300 inside the consumable unit 200.

Figure 14:
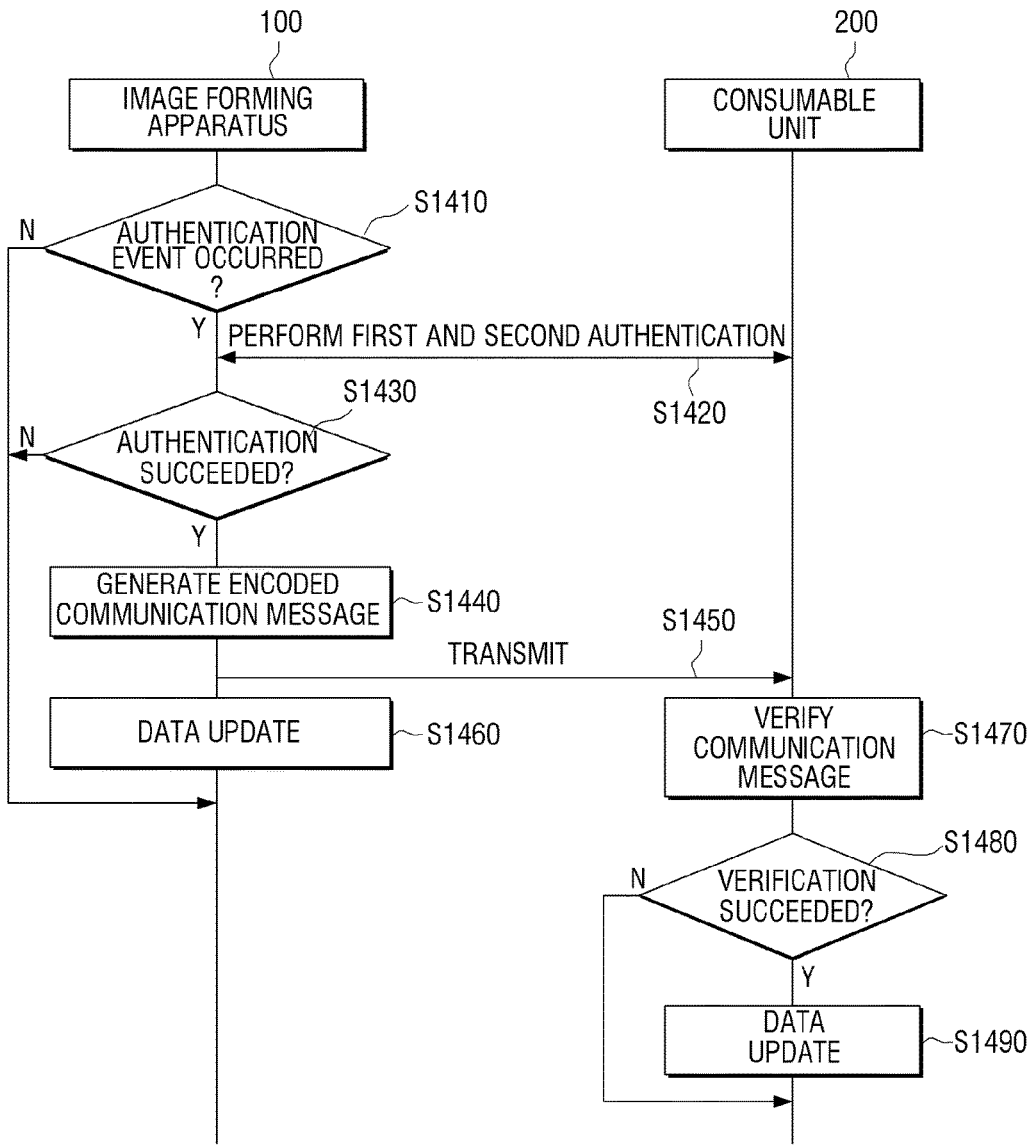
FIG. 14 is a timing view for explaining a communication method of encoded data according to an exemplary embodiment.

FIG. 14 is a flowchart for explaining a process where authentication and encoding data communication are performed. According to FIG. 14, when an authentication event occurs (S1410), the image forming apparatus 100 performs a first and second authentication between itself and the consumable unit 200. As aforementioned, the first and second authentications may be performed by the main controller 110 and authentication controller 120, respectively (S1420). The first authentication is a software authentication method where the main controller 110 performs according to firmware, while the second authentication is a hardware authentication method where the authentication controller 120 performs using various ASIC and logics. Explanation on specific authentication methods was made above, and thus repeated explanation is omitted.

When both the first authentication and second authentication succeed (S1430), the image forming apparatus 100 may use the consumable unit 200 to perform various jobs. When there occurs an event where a job or other communications must be performed, the image forming apparatus 100 generates an encoded communication message (S1440). More specifically, the image forming apparatus 100 encodes the data to be transmitted with a section key to generate a MAC. For brevity of explanation, the generated MAC is referred to as a third MAC. The image forming apparatus 100 transmits the communication message where data and the MAC are combined to the consumable unit 200 (S1450). The transmitted data may be various information such as the number of printed pages, printing option, amount of consumable unit used in the printing, date of printing, and user information etc. In addition, in operation S1460, data is stored in the image forming apparatus 100 if authentication was successful in operation S1430. On the other hand, when the authentication in operation S1430 fails, the image forming apparatus 100 does not store the data.

When the encoded communication message is transmitted (S1450), the consumable unit 200 verifies the communication message (S1470). More specifically, the consumable unit 200 separates the data included in the communication message and the third MAC. In addition, the consumable unit 200 generates a section key by itself, and encodes the separated data with the section key to generate a fourth MAC. The consumable unit 200 compares the fourth MAC and the third MAC, and if they correspond to each other, the consumable unit 200 determines that the verification succeeded (S1480).

When the verification is completed, data is stored in the memory 320 of the CRUM chip 300 provided in the consumable unit 200 (S1490). On the other hand, when the verification fails, the consumable unit 200 does not store the received data. Accordingly, even when the consumable unit 200 is separated from the main body of the image forming apparatus 100 and is mounted on another apparatus, it is possible to precisely manage the state of usage of the consumable unit 200.

The image forming apparatus 100 may store the corresponding data in the main body storage 910 provided in itself or in the memory 920. Accordingly, it is possible to manage data separately from the consumable unit 200. The image forming apparatus 100 may match the identification information of the consumable unit 200 to the data and store the same, and whenever an event occurs where data is modified, the image forming apparatus 100 may update the stored data.

The encoding data communication explained in FIG. 14 may be performed by the main controller 110. In addition, the operations of the consumable unit 200 explained in FIG. 14 may be performed by the CRUM chip mounted on the consumable unit 200, but there is no limitation thereto. That is, besides the CRUM chip 300, an addition processor may be mounted on the consumable unit 200, and the encoding data communication may be designed such that the corresponding processor may be performed.

When either one of the first authentication and second authentication has failed, or when the consumable unit 200 has failed in the communication message verification in the process of encoding data communication, the main controller 110 may notify the user who input a job command of an error state.

Figure 15:
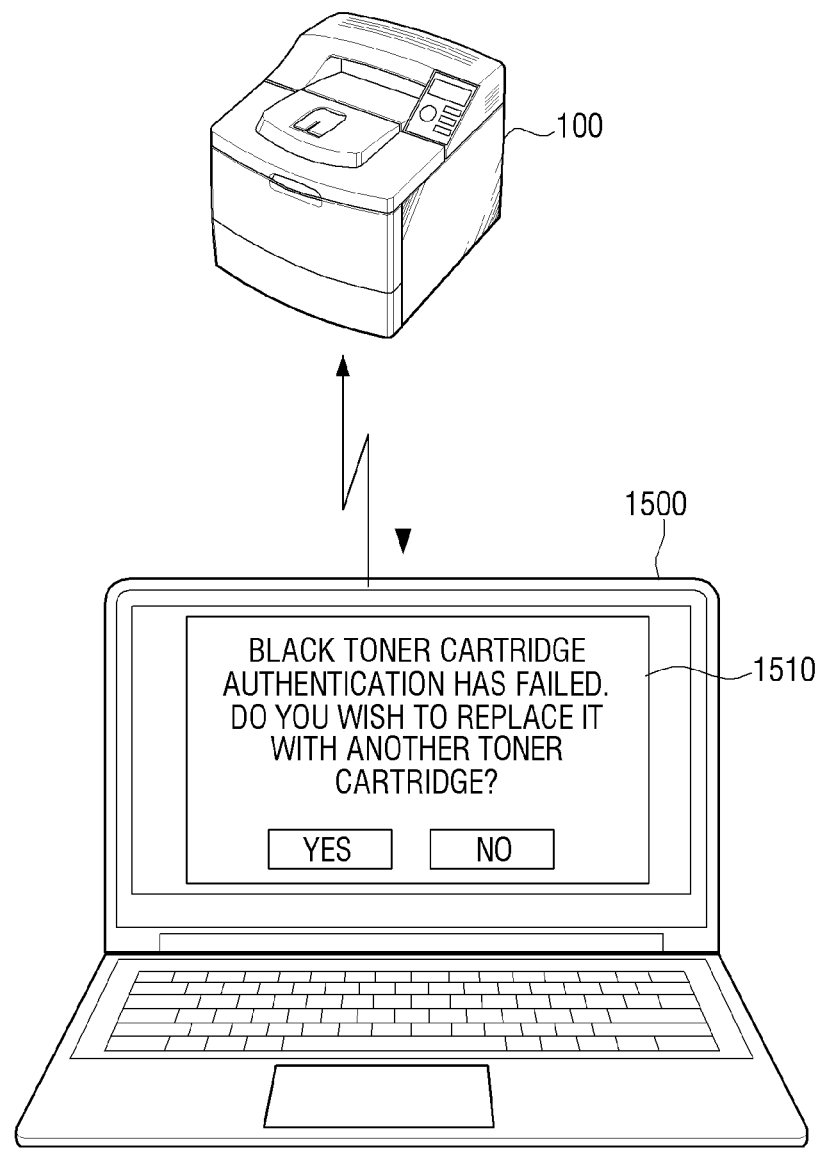
FIG. 15 is a view for explaining an example of processing when an authentication failed.

FIG. 15 is a view for explaining a process of notifying a user of an error state through a host apparatus of the user. In FIG. 15, the image forming apparatus 100 and host apparatus 1500 may be connected to each other through a local interface or network.

When the first authentication or second authentication regarding the consumable unit 200 failed, the image forming apparatus 100 restricts the functions of the consumable unit 200 as aforementioned. If the consumable unit 200 is a developing cartridge that is involved in an image forming job, the image forming job is not performed. The image forming apparatus 100 may transmit the fact that the authentication failed to the host apparatus 1500. The host apparatus 1500 may display a message 1510 that the authentication failed.

There may be a state where the consumable unit 200 may be replaced by other configurative elements. For example, of C, M, Y, K toner cartridges, in the case where an authentication regarding K toner cartridge failed and authentications regarding the remaining cartridges succeeded, it is possible to use the C, M, Y toner cartridges to express black. Herein, if the authentication regarding K toner cartridge failed, it is possible to restrict only the use of the K toner cartridge, and use the remaining toner cartridges to perform an image forming job. The main controller 110 may use the consumable units of which the authentication succeeded instead of the consumable unit of which the authentication failed to transmit the signal for inquiring whether or not to perform an image forming job to the host apparatus 1500. The host apparatus 1500 displays an inquiring message 1510 according to such a signal. When the user agrees to the inquiring message, the host apparatus 1500 transmits a confirmation command to the image forming apparatus 100. Accordingly, the image forming job using the consumable units of which the authentication succeeded may be performed.

In the aforementioned various exemplary embodiments, it was explained that authentications are performed regarding consumable units mounted on an image forming apparatus, but these methods are not limited to just image forming apparatuses. That is, the aforementioned various exemplary embodiments may also be applied to cases authenticating external configurative elements or internal configurative elements in a general electronic apparatus. For example, external storage media may be connected through a USB cable regarding various terminal apparatuses such as a mobile phone, PC, tablet PC, laptop PC, and TV etc. The main controller provided inside the terminal apparatus may perform a first authentication according to software, and an authentication controller provided inside the same terminal apparatus may perform a second authentication which would be a hardware authentication using ASIC. Accordingly, when such a terminal apparatus is being hacked, it is possible to prevent using an external storage medium in the terminal apparatus.

Processes, functions, methods, and/or software in apparatuses described herein may be recorded, stored, or fixed in one or more non-transitory computer-readable storage media (computer readable recording medium) that includes program instructions (computer readable instructions) to be implemented to cause one or more processing elements to execute or perform the program instructions. Examples of processing elements include controllers, ASICs, CPUs, processors, and the like. The media may also include, alone or in combination with the program instructions, data files, data structures, and the like. The media and program instructions may be those specially designed and constructed, or they may be of the kind well-known and available to those having skill in the computer software arts. Examples of program instructions include machine code, such as produced by a compiler, and files containing higher level code that may be executed by the computer using an interpreter. In addition, a non-transitory computer-readable storage medium may be distributed among devices and computer-readable codes or program instructions may be stored and executed in a decentralized manner by processing elements such as controllers, ASICs, CPUs, processors, and the like.

Although a few embodiments have been shown and described, it would be appreciated by those skilled in the art that changes may be made in embodiments without departing from the principles and spirit of the disclosure, the scope of which is defined in the claims and their equivalents.

What is claimed is:

1. An image forming apparatus, comprising:
    a consumable unit where a custom replaceable unit monitor (CRUM) chip is mounted; and
    a main body configured to perform a first authentication and a second authentication of the consumable unit, when the consumable unit is mounted,
    wherein the main body comprises:
    a main controller to perform the first authentication with respect to firmware stored in the image forming apparatus by transmitting an encoded signal including a first value to the CRUM chip, and by using a first Message Authentication Code (MAC) generated by a central processing unit (CPU) of the CRUM chip based on the first value and a second MAC generated by the main controller; and
    an authentication controller to use at least one ASIC (Application Specific Integrated Circuit) to perform the second authentication of the consumable unit,
    wherein the second authentication is performed using the at least one ASIC in parallel with performance of the first authentication, or is performed subsequent to performance of the first authentication if the first authentication succeeds.

2. The apparatus according to claim 1, wherein:
    the authentication controller performs the second authentication separately from the first authentication performed by the main controller, and
    the main controller performs communication with the CRUM chip, when both the first authentication and the second authentication succeed.

3. The apparatus according to claim 1, wherein:
    the main controller and the authentication controller perform the first authentication and the second authentication, separately, when an event requiring performing an authentication is input, and
    the event is an event where one of a power reset signal, replacement signal of the consumable unit, and an image forming job completion job is input.

4. The apparatus according to claim 1, further comprising a system function controller configured to restrict functions of the consumable unit when at least one authentication of the first authentication and the second authentication fails, wherein the authentication controller comprises:
    an interface to receive authentication information including a first authentication MAC from the CRUM chip;
    an authentication processor configured to use the authentication information to generate a second authentication MAC, and compare the first authentication MAC with the second authentication MAC to verify the CRUM chip; and
    a function restriction requester configured to transmit a function restriction request to the system function controller when the authentication of the CRUM chip fails.

5. The apparatus according to claim 4, wherein the authentication processor comprises:
    an electronic signature verifier to verify an electronic signature included in the authentication information;
    a section key generator to generate a section key;
    a MAC generator configured to use the section key to generate the second authentication MAC; and
    a MAC verifier configured to compare the second authentication MAC with the first authentication MAC, and to provide a result of comparison to the function restriction requester, wherein the at least one ASIC includes the electronic signature verifier, section key generator, MAC generator, and MAC verifier.

6. The apparatus according to claim 1, wherein the CRUM chip comprises:
an interface configured to be connected to the main controller;
a memory to store information on the consumable unit;
the CPU configured to be connected to the main controller through the interface, and to perform the first authentication between the CPU and the main controller; and
an authentication ASIC configured to perform the second authentication between the authentication ASIC and the authentication controller,
wherein the CPU updates the information stored in the memory according to a signal transmitted from the main controller, when both the first authentication and the second authentication succeed.

7. The apparatus according to claim 1, wherein the CRUM chip comprises:
an interface configured to be connected to the main controller;
a memory where an operating system (O/S) of the CRUM chip is stored separately from the main body O/S of the image forming apparatus; and
the CPU configured to use the O/S of the CRUM chip to perform the first authentication between the CPU and the main controller, and to perform the second authentication between the CPU and the authentication controller.

8. The apparatus according to claim 1, wherein the main controller and authentication controller are separately connected to a bus, and each of the main controller and authentication controller communicate with the CRUM chip through the bus.

9. A custom replaceable unit monitor (CRUM) chip mountable on a consumable unit of an image forming apparatus, the CRUM chip comprising:
an interface configured to be connected to the image forming apparatus;
a memory to store information on the consumable unit;
a central processing unit (CPU) configured to perform, through the interface, a first authentication with respect to firmware stored in the image forming apparatus in association with a main controller mounted on the image forming apparatus by using a first Message Authentication Code (MAC) generated by the CPU based on first value included in an encoded signal received from the main controller, and by using a second MAC generated by the main controller; and
an authentication ASIC (Application Specific Integrated Circuit) configured to perform a second authentication in order to perform the second authentication in association with an authentication controller comprising at least one ASIC (Application Specific Integrated Circuit) mounted on the image forming apparatus,
wherein the second authentication is performed using the authentication ASIC in parallel with performance of the first authentication, or is performed subsequent to performance of the first authentication if the first authentication succeeds.

10. The CRUM chip according to claim 9, wherein the CPU updates information stored in the memory of the CRUM chip according to a signal transmitted from the main controller, when both the first authentication and the second authentication succeed.

11. The CRUM chip according to claim 9, wherein the ASIC in association with the authentication controller performs the second authentication separately from the first authentication performed by the central processing unit in association with the main controller.

12. A custom replaceable unit monitor (CRUM) chip mountable on a consumable unit of an image forming apparatus, the CRUM chip comprising:
an interface configured to be connected to the image forming apparatus;
a memory where an operating system (O/S) of the CRUM chip is stored separately from a main body O/S of the image forming apparatus;
a central processing unit (CPU) configured to be connected to the image forming apparatus through the interface, configured to use the O/S of the CRUM chip to perform, through the interface, a first authentication with respect to firmware stored in the image forming apparatus in association with a main controller mounted on the image forming apparatus through the interface by using a first Message Authentication Code (MAC) generated by the CPU based on first value included in an encoded signal received from the main controller, and by using a second MAC generated by the main controller, and configured to use the O/S of the CRUM chip to perform a second authentication in association with an authentication controller mounted on the image forming apparatus,
wherein the second authentication is performed using at least one ASIC (Application Specific Integrated Circuit) of the authentication controller, and is performed in parallel with performance of the first authentication, or is performed subsequent to performance of the first authentication if the first authentication succeeds.

13. The CRUM chip according to claim 12, wherein the authentication controller using the at least one ASIC performs the second authentication separately from the first authentication performed by the main controller according to the firmware.

14. A method for authenticating a consumable unit of an image forming apparatus, the method comprising:
determining whether an event requiring an authentication of a consumable unit mounted on the image forming apparatus occurred;
in response to determining that the event occurred:
performing a first authentication with respect to firmware stored in the image forming apparatus by executing computer readable instructions stored in the image forming apparatus by a main controller mounted on the image forming apparatus; and
performing a second authentication of the consumable unit separately from the main controller by an authentication controller comprising at least one ASIC (Application Specific Integrated Circuit),
wherein
the performing the first authentication includes the main controller transmitting an encoded signal including a first value to the consumable unit, and the main controller using a first Message Authentication Code (MAC) generated by the consumable unit based on the first value and a second MAC generated by the main controller, and
the performing the second authentication is performed using the at least one ASIC in parallel with performing the first authentication, or is performed subsequent to performing the first authentication if the first authentication succeeds.

15. The method according to claim 14, further comprising:
completing the authentication of the consumable unit when the first authentication and the second authentication succeed; and
processing the authentication of the consumable unit as a failure when at least one of the first authentication and the second authentication fails.

16. The method according to claim 14, wherein the event is an event where at least one of a power reset signal, replacement signal of the consumable unit, and image forming job completion signal is input.

17. The method according to claim 14, wherein the performing the second authentication comprises:
receiving authentication information comprising a first authentication MAC from a CRUM chip of the consumable unit;
generating a second authentication MAC using the authentication information; and
comparing the first authentication MAC and the second authentication MAC to authenticate the CRUM chip.

18. The method according to claim 17, wherein the comparing the first authentication MAC and the second authentication MAC comprises:
verifying an electronic signature included in the authentication information using an electronic signature authentication ASIC;
generating a section key using a section key generation ASIC, when the electronic signature is verified;
generating the second authentication MAC using the section key in a MAC generation ASIC; and
comparing the second authentication MAC and the first authentication MAC in a MAC verification ASIC.

19. A method for authenticating a consumable unit of an image forming apparatus, the method comprising:
determining whether or not an event requiring an authentication of a consumable unit mounted on the image forming apparatus occurred;
in response to determining that the event occurred:
performing a first authentication with respect to firmware stored in the image forming apparatus by executing computer readable instructions stored in the image forming apparatus by a main controller mounted on the image forming apparatus; and
performing a second authentication of the consumable unit separately from the main controller by using an authentication controller, which is a processing element separate from the main controller,
wherein
the performing the first authentication includes the main controller transmitting an encoded signal including a first value to the consumable unit, and the main controller using a first Message Authentication Code (MAC) generated by the consumable unit based on the first value and a second MAC generated by the main controller, and
the performing the second authentication is performed in parallel with performing the first authentication, or is performed subsequent to performing the first authentication if the first authentication succeeds.

20. At least one non-transitory computer readable medium storing computer readable instructions that control at least one processing element to implement the method of claim 19.

* * * * *